US006183830B1

(12) United States Patent
Okamoto et al.

(10) Patent No.: US 6,183,830 B1
(45) Date of Patent: Feb. 6, 2001

(54) DIGITAL VIDEO DISK SUBSTRATE

(75) Inventors: Masaya Okamoto; Shigeki Kuze, both of Ichihara (JP)

(73) Assignee: Idemitsu Petrochemical Co., Ltd., Tokyo (JP)

( * ) Notice: Under 35 U.S.C. 154(b), the term of this patent shall be extended for 0 days.

(21) Appl. No.: 09/147,048

(22) PCT Filed: Dec. 20, 1996

(86) PCT No.: PCT/JP96/03729

§ 371 Date: Sep. 25, 1998

§ 102(e) Date: Sep. 25, 1998

(87) PCT Pub. No.: WO97/36292

PCT Pub. Date: Oct. 2, 1997

(30) Foreign Application Priority Data

Mar. 28, 1996 (JP) .................................................. 8-073921

(51) Int. Cl.⁷ ...................................................... B32B 3/02
(52) U.S. Cl. .......................................... 428/64.7; 428/65.3
(58) Field of Search ................................ 428/64.1, 64.2, 428/64.7, 65.3

(56) References Cited

U.S. PATENT DOCUMENTS

| | | | |
|---|---|---|---|
| 4,506,066 | * 3/1985 | Medem et al. ........................ | 528/196 |
| 4,997,903 | 3/1991 | Okamoto .............................. | 528/198 |
| 5,373,082 | * 12/1994 | Kauth et al. ......................... | 528/196 |
| 5,510,414 | 4/1996 | Okamoto et al. .................... | 524/494 |
| 5,578,694 | * 11/1996 | Yokoyama et al. .................. | 528/198 |
| 5,747,632 | * 5/1998 | Adachi et al. ....................... | 528/196 |
| 5,783,653 | 7/1998 | Okamoto .............................. | 528/196 |

* cited by examiner

*Primary Examiner*—Paul Thibodeau
*Assistant Examiner*—Sheeba Ahmed
(74) *Attorney, Agent, or Firm*—Oblon, Spivak, McClelland, Maier & Neustadt, P.C

(57) ABSTRACT

A digital video disk substrate of a polycarbonate having a viscosity average molecular weight (Mv) of 10,000 to 17,000 and a weight average molecular weight (Mw)/ number average molecular weight (Mn) of not smaller than 2.3, and a digital video disk substrate of a polycarbonate having a viscosity average molecular weight (Mv) of 1,000 to 17,000 obtained by the transesterification of a divalent phenol such as 2,2-bis(4-hydroxyphenyl) propane with a carbonic acid diester such as diphenyl carbonate. The digital video disk substrate is little cracked at the time of molding, and exhibits small birefringence and excellent transcriptional property.

11 Claims, No Drawings

DIGITAL VIDEO DISK SUBSTRATE

TECHNICAL FIELD

The present invention relates to a digital video disk substrate, and more precisely, to that of a polycarbonate which is cracked little at the time of molding and exhibits small birefringence and excellent transcriptional ability.

BACKGROUND ART

The standards of CDs, CD-ROMs and the like which are conventional optical disks are disk diameter=120 mm, disk thickness=1.2 mm, and structure=a single plate utilizing one surface. On the contrary, the standards of digital video disks (DVDs) are disk diameter=120 mm, disk thickness=1.2 mm, and structure=both surfaces stuck. Accordingly, the thickness of each disk substrate is 0.6 mm. As materials of these disk substrates, polycarbonates are much used in recent years, as having high transparency, good heat resistance, good impact resistance and good water resistance.

However, thin disk substrates, of which the thickness is reduced from 1.2 mm to 0.6 mm as so mentioned in the above, are often problematic in that they will be cracked or broken during molding and that their birefringence may increase. In order to prevent the disks from being cracked during molding, the molecular weight of the polycarbonate which Ls the substrate material can be increased, but in this case, the birefringence of the disks further increases. On the other hand, in order to reduce the birefringence, it has been attempted to mold the digital video disk substrates by the use of techniques such as ultrasonic molding, multi-stage compression molding and high-speed filling molding. Even by these techniques, however, the reduction in the birefringence is not sufficient, and what is worse, the breakage of the disks more often occurs as compared with usual molding techniques.

Under such circumstances, the present invention has been attained, and an object of the invention is to provide a digital video disk substrate which is cracked little during molding and which exhibits small birefringence and excellent transcriptional ability.

DISCLOSURE OF THE INVENTION

The present inventors have intensively researched on digital video disk substrates which are cracked little during molding and which exhibit small birefringence, and, as a result, have found that the above-mentioned object can be achieved by the use of a polycarbonate of which the molecular weight falls within a specific range and which has a broad molecular weight distribution, or a polycarbonate which is obtained by transesterification to have a molecular weight falling within a specific range, as the substrate material. The present invention has been completed on the basis of the thus-found knowledge.

Specifically, the present invention provides the following:

1. A digital video disk substrate of a polycarbonate having a viscosity-average molecular weight (Mv) of from 10,000 to 17,000 and a weight-average molecular weight (Mw)/number-average molecular weight (Mn) of not smaller than 2.3.

2. A digital video disk substrate of a polycarbonate obtained by the transesterification of a diphenol and a carbonic acid diester to have a viscosity-average molecular weight (Mv) of from 10,000 to 17,000.

3. The digital video disk substrate of 2, wherein a nitrogen-containing basic compound and a nitrogen-free basic compound are used as the catalyst for the transesterification.

4. The digital video disk substrate of 3, wherein the nitrogen-containing basic compound is a quaternary ammonium salt.

5. The digital video disk substrate of 3, wherein the nitrogen-free basic compound is a quaternary phosphonium salt.

6. The digital video disk substrate of 4, wherein the quaternary ammonium salt is tetramethylammonium hydroxide.

7. The digital video disk substrate of 5, wherein the quaternary phosphonium salt is tetraphenylphosphonium tetraphenylborate.

8. The digital video disk substrate of 1 or 2, wherein the polycarbonate has a viscosity-average molecular weight (Mv) of from 12,000 to 16,000.

9. The digital video disk substrate of 1 or 2, wherein the polycarbonate has a viscosity-average molecular weight (Mv) of from 13,500 to 15,500.

BEST MODES OF CARRYING OUT THE INVENTION

The polycarbonate which is used as the material for the DVD substrate of the invention can be produced in any conventional manner of a solution method (interfacial polymerization method, pyridine method), a transesterification method and the like. In general, it can be produced by reacting a diphenol with a polycarbonate precursor such as phosgene, a carbonic acid ester or the like. Concretely, for example, the polycarbonate is produced by reacting a diphenol with a carbonate precursor such as phosgene in a solvent such as methylene chloride or the like in the presence of a known acid receptor or a molecular weight regulator, to which is optionally added a branching agent (interfacial polymerization); or by transesterifying a carbonic acid diester such as diphenyl carbonate with a diphenol (transesterification). Preferred is the polycarbonate as produced by transesterification of a diphenol with a carbonic acid diester.

Preferred examples of the diphenol to be used for producing the polycarbonate include compounds of a general formula (I):

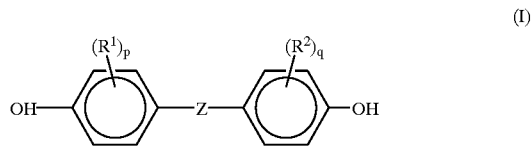

(I)

In formula (I), $R^1$ and $R^2$ each represent a halogen atom, an alkyl group having from 1 to 6 carbon atoms, or aphenyl group. The halogen atom includes chlorine, bromine, fluorine and iodine atoms. The alkyl group having from 1 to 6 carbon atoms may be any of linear, branched or cyclic ones, and includes, for example, methyl, ethyl, n-propyl, isopropyl, n-butyl, isobutyl, t-butyl, amyl, isoamyl, hexyl, isohexyl and cyclohexyl groups, etc. $R^1$ and $R^2$ maybe the same or different. Plural $R^1$'s, if any, may be the same or different; and plural $R^2$'s, if any, may be the same or different. p and q each represent an integer of from 0 to 4. Z represents a single bond, an alkylene or alkylidene group having from 1 to 20 carbon atoms, a cycloalkylene or cycloalkylidene group having from 5 to 20 carbon atoms, —O—, —S—, —SO—, —SO$_2$—, or —CO—. The alkylene or alkylidene group having from 1 to 20 carbon atoms includes, for example, methylene, ethylene, propylene, butylene, pentylene, hexylene, ethylidene and isopropylidene groups, etc. The cycloalkylene or cycloalkylidene group having from 5 to 20 carbon atoms includes, for example, cyclopentylene, cyclohexylene, cyclopentylidene and cyclohexylidene groups, etc.

A variety of diphenols of formula (I) are known. Of those, especially preferred is 2,2-bis(4-hydroxyphenyl)propane [bisphenol A]. Other examples of the diphenols except bisphenol A include dihydroxydiarylalkanes such as bis(4-hydroxyphenyl)methane, bis(3,5-dichloro-4-hydroxyphenyl)methane, bis(3,5-dimethyl-4-hydroxyphenyl)methane, 1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydioxyphenyl)pentane, 4-methyl-2,2-bis(4-hydroxyphenyl pentane, 2,2-bis(4-hyiroxyphenyl)hexane, 4,4-bis (4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, 2,2-bis(4-hydroxyphenyl)-1,1,1,3,3,3-hexafluoropropane, etc.; dihydroxydiarylcycloalkanes such as 1,1-bis(4-hydroxyphenyl)cyclohexane, 1,1-bis(3,5-dichloro-4-hydroxyphenyl)cyclohexane, 1,1-bis(4-hydroxyphenyl)cyclodecane, etc.; dihydroxydiarylsulfones such as bis(4-hydroxyphenyl)sulfone, bis(3,5-dimethyl-4-hydroxyphenyl) sulfone, bis(3-chloro-4-hydroxyphenyl) sulfone, etc.; dihydroxydiaryl ethers such as bis(4-hydroxyphenyl) ether, bis (3,5-dimethyl-4-hydroxyphenyl) ether, etc.; dihydroxydiaryl ketones such as 4,4'-dihydroxybenzophenone, 3,3',5,5'-tetramethyl-4,4'-dihydroxybenzophenone, etc.; dihydroxydiarylsulfides such as bis(4-hydroxyphenyl) sulfide, bis(3-methyl-4-hydroxyphenyl)sulfide, bis(3,5-dimethyl-4-hydroxyphenyl) sulfide, etc.; dihydroxydiarylsulfoxides such as bis(4-hydroxyphenyl) sulfoxide, etc. Apart from those noted above, hydroquinone, 9,9-bis(4-hydroxyphenyl) fluorenone and their halide derivatives are also usable as diphenols. The diphenols may be used either singly or as combined.

A variety of carbonic acid diesters are known, of which preferred are diaryl carbonates, dialkyl carbonates and alkylaryl carbonates. The diaryl carbonates include, for example, diphenyl carbonate, ditolyl carbonate, bis(chlorophenyl) carbonate, dinaphthyl carbonate, bisphenol A-bisphenyl carbonate, etc. The dialkyl carbonates include, for example, dimethyl carbonate, diethyl carbonate, dibutyl carbonate, dicyclohexyl carbonate, bisphenol A-bismethyl carbonate, etc. The alkylaryl carbonates include, for example, methylphenyl carbonate, ethylphenyl carbonate, butylphenyl carbonate, cyclohexylphenyl carbonate, bisphenol A-methylphenyl carbonate, etc. These may be used either singly or as combined. Especially preferred is diphenyl carbonate.

The amount of the carbonic acid diester to be reacted is preferably from 0.9 to 2.5, more preferably from 0.98 to 2.0, in terms of the molar ratio thereof to the diphenol.

In the method of producing the polycarbonates, further usable is a terminal terminator (molecular weight regulator) in addition to the components noted above. As the terminal terminator, for example, usable is a monophenol such as p-tert-butylphenol, p-bromophenol, tribromophenol, nonylphenol or the like.

Further optionally, usable is a compound having three or more functional groups, as a branching agent. The compound may include phloroglucin, trimellitic acid, 1,1,1-tris (4-hydroxyphenyl)ethane, 1-[α-methyl-α-(4'-hydroxyphenyl)ethyl]-4-[α',α'-bis(4"-hydroxyphenyl)ethyl] benzene, α,α',α"-tris(4-hydroxyphenyl)-1,3,5-triisopropylbenzene, isatinbis(o-cresol), etc.

In the method of producing the polycarbonates by transesterification, if desired, usable is any conventional catalyst for ordinary transesterification.

The transesterification catalyst employable herein includes, for example, nitrogen-containing basic compounds such as amines, quaternary ammonium salts, etc.; and nitrogen-free basic compounds such as alkali metal compounds (e.g., lithium hydroxide, sodium hydroxide, potassium hydroxide, etc.), alkaline earth metal compounds, boron compounds, etc.

The amount of the catalyst, if used, may be generally from $1 \times 10^{-8}$ to $1 \times 10^{-2}$ mols, but preferably from $1 \times 10^{-7}$ to $1 \times 10^{-3}$ mols, per mol of the diphenol.

If its amount is smaller than $1 \times 10^{-8}$ mols, the catalyst will be ineffective. If larger than $10^{-2}$ mols, however, too much catalyst will worsen the physical properties, especially heat resistance andhydrolysis resistance of the final products, polycarbonates, and increases the production costs. Addition of a larger amount of the catalyst over the defined range is unnecessary.

As the transesterification catalyst, if used, preferred are the nitrogen-containing basic compounds noted above. The compounds include, for example, aliphatic tertiary amines such as trimethylamine, triethylamine, tripropylamine, tributylamine, tripentylamine, trihexylamine, dimethylbenzylamine, etc.; and aromatic tertiary amines such as triphenylam ne, etc. Also usable are nitrogen-containing heterocyclic compounds such as N,N-dimethyl-4-aminopyridine, 4-diethylaminopyridine, 4-pyrrolidinopyridine, 4-aminopyridine, 2-aminopyridine, 2-hydroxypyridine, 4-hydroxypyridine, 2-methoxypyridine, 4-methoxypyridine, imidazole, 2-methylimidazole, 4-methylimidazole, 2-dimethylaminoimidazole, 2-methoxyimidazole, 2-mercaptoimidazole, aminoquinoline, diazabicyclooctane (DABCO), etc. As the nitrogen-containing basic compounds, more preferred are quaternary ammonium salts such as those mentioned below. First mentioned are ammonium hydroxides having alkyl, aryl, aralkyl and the like groups, such as tetramethylammonium hydroxide, tetraethylammonium hydroxide, tetrabutylammonium hydroxide, trimethylbenzylammonium hydroxide, etc. Of those ammonium salts, preferred are tetramethylammonium hydroxide and tetrabutylammonium hydroxide. Further mentioned are other basic salts such as tetramethylammonium borohydride, tetrabutylammonium borohydride, tetrabutylammonium phenylborate, tetramethylammonium tetraphenylborate, etc. Above all, especially preferred are those nitrogen-containing basic compounds, as being basic and remaining little in the reaction system.

As the transesterification catalyst, if used, also preferred are the nitrogen-free basic compounds noted above. The compounds include, for example, basic metal oxides such as lead oxide, antimony oxide, etc.; organic titanium compounds; soluble manganese compounds; Ca, Mg, Zn, Pb, Sn, Mn, Cd and Co acetates; alkali metal compounds such as lithium hydroxide, sodiumhydroxide, potassiumhydroxide, etc.; single substances, oxides and hydroxides of alkali metals or alkaline earth metals; alkaline earth metal compounds; boron compounds such as boric acid, trimethyl borate, triethyl borate, tributyl borate, triheptyl borate, triphenyl borate, tetraphenylphosphonium tetraphenylborate, etc. As the nitrogen-free basic compounds, especially preferred are quaternary phosphonium salts such as those mentioned below. The salts include tetra(aryl or alkyl)phosphonium hydroxides such as tetraphenylphosphonium hydroxide, tetranaphtylphosphonium hydroxide, tetra(chlorophenyl) phosphonium hydroxide, tetra(biphenyl)phosphonium hydroxide, tetratolylphosphonium hydroxide, tetramethylphosphonium hydroxide, tetraethylphosphonium hydroxide, tetrabutylphosphonium hydroxide, etc.; as well as tetramethylphosphonium tetraphenylborate, tetraphenylphosphonium bromide, tetraphenylphosphonium phenolate, tetraphenylphosphonium tetraphenylborate, methyltriphenylphosphonium tetraphenylborate, benzyltriphenylphosphonium tetraphenylborate, biphenyltriphenylphosphonium tetraphenylborate, tetratolylphosphonium tetraphenylborate, cyclohexyltriphenylphosphonium tetraphenylborate, tetraphenylphosphonium phenolate, tetra (p-t-butylphenyl)phosphonium diphenylphosphate, triphenylbutylphosphonium phenolate, triphenylbutylphosphonium tetraphenylborate, etc. Of those quaternary phosphonium salts, preferred are tetraphenylphosphonium tetraphenylborate, biphenyltriphenylphosphonium tetraphenylborate and cyclohexyltriphenylphosphonium tetraphenylborate, as having high catalytic activity and having few negative influences on the quality of the products. The quaternary phosphonium salts may be used either singly or as combined.

A combined catalyst system is preferably employed in the transesterification. As preferred examples of the combined catalyst system, mentioned are a combination of a nitrogen-containing basic compound and a boron compound; a combination of a nitrogen-containing basic compound and an alkali (alkaline earth) metal compound; a combination of a nitrogen-containing basic compound, an alkali (alkaline earth) metal compound and a boron compound. Most preferred is a combination of tetramethylammonium hydroxide and tetraphenylphosphonium tetraphenylborate.

In the combined catalyst system for use in the transesterification, it is desirable that the amount of the nitrogen-containing basic compound is from $10^{-7}$ to $10^{-1}$ mols, preferably from $10^{-6}$ to $10^{-2}$ mols, more preferably from $10^{-5}$ to $10^{-3}$ mols, while that of the nitrogen-tree basic compound is from $10^{-8}$ to $10^{-3}$ mols, preferably from $10^{-7}$ to $10^{-4}$ mols, more preferably from $10^{-6}$ to $10^{-5}$ mols. If the amount of the nitrogen-containing basic compound is smaller than $10^{-7}$ mols, the catalytic activity of the compound in the initial stage of the reaction will be poor. However, use of the compound in an amount of larger than $10^{-1}$ mols is unfavorable, as increasing the production costs. On the other hand, if the amount of the nitrogen-free basic compound is smaller than $10^{-8}$ mols, the catalytic activity of the compound in the latter stage of the reaction will be poor; but use of the compound in an amount of larger than $10^{-3}$ mols is unfavorable, as increasing the production costs.

Regarding the amount of the combined catalyst system to be used, the total of the nitrogen-containing basic compound and the nitrogen-free basic compound is generally from $1\times10^{-8}$ to $1\times10^{-2}$ mols, but preferably from $1\times10^{-7}$ to $1\times10^{-3}$ mols, per mol of the diphenol.

If the amount is smaller than $1\times10^{-8}$ mols, the catalytic effect could not be exhibited. If larger than $10^{-2}$ mols, however, such a too much amount will worsen the physical properties, especially heat resistance and hydrolysis resistance of the final products, polycarbonates, and increases the production costs. Addition of a larger amount of the catalyst compounds over the defined range is unnecessary.

The reaction temperature for the transesterification is not specifically defined, and may fall generally between 100 and 330° C., but preferably between 180 and 300° C. More preferably, the reaction temperature is gradually elevated during the reaction within the range falling between 180 and 300° C. If the reaction temperature is lower than 100° C., the transesterification will be retarded. If higher than 330° C., however, the polymers produced will be thermally deteriorated, and such high reaction temperature is unfavorable.

The reaction pressure is not specifically defined, and may be suitably determined depending on the vapor pressure of the monomers being polymerized. In general, however, it is desirable that the polymerization is effected at a pressure falling between reduced pressure of about 50 mmHg and increased pressure of about 50 atmospheres in the initial stage, then under reduced pressure in the latter stage, and finally at a pressure falling between 0.01 and 100 mmHg.

Regarding the reaction time, the reaction may be continued until it gives the polycarbonate having a predetermined molecular weight. In general, the total reaction time may fall between 10 minutes and 10 hours or so.

The reaction maybe effected in the presence of no solvent. If desired, however, it may be effected in the presence of an inert solvent weighing from 1 to 150% by weight of the polycarbonate to be obtained. The inert solvent includes, for example, aromatic compounds such as diphenyl ether, halogenated diphenyl ethers, diphenylsulfone, benzophenone, polyphenyl ether, dichlorobenzene, methylnaphthalene, etc.; cycloalkanes such as cyclohexane, tricyclo(5.2.10)decane, cyclooctane, cyclodecane, etc.

The polycarbonates having been obtained in the manner noted above may be used directly in the invention, but must be so controlled as to have a viscosity-average molecular weight (Mv) falling between 10,000 and 17,000, for example, by mixing them. DVD substrates of polycarbonates having a viscosity-average molecular weight of smaller than 10, 000 will be cracked at the time of molding, while those of polycarbonates having a viscosity-average molecular weight of larger than 17,000 will exhibit increased birefringence. In order to prevent the cracking of DVD substrates and in view of the birefringence of DVD substrates, it is preferable that the polycarbonates have a viscosity-average molecular weight of from 12,000 to 16,000, more preferably from 13,500 to 15,500. The molecular weight distribution of the polycarbonates is not specifically defined, but it is desirable that the ratio of the weight-average molecular weight (Mw) of the polymer to the number-average molecular weight (Mn) thereof, or that is, Mw/Mn is not smaller than 2.3, more preferably not smaller than 2.5. If the molecular weight distribution is too narrow, or that is, if the ratio Mw/Mn is too small, DVD substrates of the polymers will be cracked or broken at the time of molding.

The method of controlling the viscosity-average molecular weight (Mv) of the polymer to fall between 10,000 and 17,000 is not specifically defined. In general, the polycarbonates having been produced in a solution method (interfacial polymerization method, pyridine method), a transesterification method or the like are so mixed that the viscosity-average molecular weight (Mv) of the resulting mixture may fall within the intended range. For example, different polycarbonates obtained in a solution method are mixed together, or a polycarbonate obtained in a solution method is mixed with a polycarbonate obtained in a transesterification method.

The method of controlling the ratio, weight-average molecular weight (Mw)/number-average molecular weight (Mn) is not specifically defined. Polycarbonates obtained in a transesterification method are easily controlled to have the ratio of not smaller than 2.3. On the other hand, for those obtained in a solution method, two or more polycarbonates that differ in the molecular weight are mixed together, or a polycarbonate obtained in a solution method may be mixed with a polycarbonate obtained in a transesterification method.

If desired, various additives may be added to the polycarbonates noted above without detracting from the object of the invention. The additives include, for example, antioxidants, lubricants (mold release agents), inorganic fillers, flame retardants, colorants, etc.

As the antioxidants, preferred are phosphorus-containing ones, which include, for example, trialkyl phosphites such as trimethyl phosphite, triethyl phosphite, tributyl phosphite, trioctyl phosphite, trinonyl phosphite, tridecyl phosphite, trioctadecyl phosphite, distearylpentaerythrityl diphosphite, tris(2-chloroethyl) phosphite, tris(2,3-dichloropropyl) phosphite, etc.; tricycloalkyl phosphites such as tricyclohexyl phosphite, etc.; triaryl phosphites such as triphenyl phosphite, tricresyl phosphite, tris(ethylphenyl) phosphite, tris(butylphenyl) phosphite, tris(nonylphenyl) phosphite, tris(hydroxyphenyl) phosphite, etc.; monoalkyldiaryl phosphites such as 2-ethylhexyldiphenyl phosphite, etc.; trialkyl phosphates such as trimethyl phosphate, triethyl phosphate, tributyl phosphate, trioctyl phosphate, tridecyl phosphate, trioctadecyl phosphate, distearylpentaerythrityl diphosphate, tris(2-chloroethyl) phosphate, tris(2,3-dichloropropyl) phosphate, etc.; tricycloalkyl phosphates such as tricyclohexyl phosphate, etc.; triaryl phosphates such as triphenyl phosphate, tricresyl phosphate, tris(nonylphenyl) phosphate, 2-ethlphenyldiphenyl phosphate, etc. These may be used either singly or as combined.

The lubricants (mold release agents) include, for example, stearyl alcohol, stearic acid monoglyceride, stearates such as pentaerythrityl stearate, bees wax, etc. Those lubricants have the ability to improve the mold releasability of the moldings of the polycarbonates.

The DVD substrates of the invention are produced by molding a material comprising the polycarbonate noted above and optionally various additives, and the molding method is not specifically defined. Any mold for disk molding can be used, and any ordinary molding technique such as injection molding or compression molding can be used. In addition, ultrasonic molding, multi-stage compression molding, high-speed filling molding or the like can also be employed.

The molding temperature is usually in the range between 300 and 390° C., but preferably between 300 to 345° C., and the mold temperature may be generally between 80 and 125° C. To reduce the birefringence of the moldings, DVD substrates and to improve the transcriptional ability thereof, the fluidity of the resin being molded must be increased. However, if the molding temperature is higher than 390° C., the polycarbonate being molded will be deteriorated, often resulting in that the transparency of the moldings obtained is lowered. High transparency is indispensable to DVD substrates. The mold temperature is preferably higher in order to increase the fluidity of the resin being molded, but if it is higher than 125° C., the substrates molded will be deformed. For injection molding, the injection rate is preferably not smaller than 150 cm$^3$/sec, more preferably not smaller than 200 cm$^3$/sec. If the rate is smaller than 150 cm$^3$/sec, the molding material will be so rapidly cooled in the mold that the fluid pressure loss and the resin orientation will increase thereby producing failed moldings with distortion. The raterial of the mold is not specifically defined, and any of metallic, ceramic, graphite and the like molds are employable.

The thus-obtained CVD substrates of the invention have many applications in the field of recording media of digital video disks (DVD family) such as those for imaging, audio, computer software, etc. The recording system to which the invention is applicable is not specifically defined, and includes many of read-only-memory type, writing-once type, rewritable type and the like media. The method of producing digital video disks from the DVD substrates of the invention is not specifically defined, and any conventional methods for producing ordinary compact disks are employable. For example, a protective layer and a recording layer are formed on the substrate in a filming step, and then a hard coat layer and optionally an overcoat layer are formed thereover to produce two disk single plates, which may be stuck on each other in an ordinary manner, for example, using a hot-melt adhesive or an adhesive sheet. If desired, a hub is attached thereto to obtain the desired digital video disk.

The hot-melt adhesive employable in this case includes, for example, ethylene-vinyl acetate copolymers (EVA), polyolefins, synthetic rubbers, polyesters, polyamides, etc. The adhesive for the adhesive sheet includes, for example, rubber adhesives, acrylic adhesives, silicone adhesives, etc. The sheet may be any of resin sheets of polyesters, polyimides, polyurethanes, polyolefins and the like, or metal sheets of aluminium foil and the like.

Now, the invention is described in more detail with reference to the following Examples, which, however, are not intended to restrict the scope of the invention.

To form DVD substrates from the polycarbonate resin pellets A, B, C, D, E, F and I produced in Examples and Comparative Examples, to evaluate them, and to measure their physical properties, used were the following methods. The data obtained in those methods are shown in Table 1, in which "–" indicates "not measured".

Formation of DVD Substrates

Each sample of polycarbonate resin pellets was injection-molded under conditions of a molding machine=IS80EPN made by Toshiba Machine Co., Ltd., mold clamping force=50 tons, injection rate=250 cm$^3$/sec, injection pressure=1500 kg/cm$^2$, mold material=duralumin 2024, molding temperature=340° C., mold temperature=115° C., cooling time=5 seconds and cavity portion=electroless nickel plating to prepare DVD substrates each having a diameter of 120 mm and a thickness of 0.6 mm.

Evaluation (1) Number of Non-cracked Samples:
In each Example, 100 DVD substrates were molded, of which the number of non-cracked ones was counted.
(2) Falling Weight Impact Strength:
Having been stored for 48 hours after their molding, the DVD substrates were subjected to a falling weight impact test in which the weight dropped down onto the substrates weighed 3.76 kg, the dropping speed was 1 m/sec, and the supporting bed had a major diameter of 50 mm. The energy (J) of the falling weight that struck the DVD substrate at the position of 18 mm of its radius was measured.

(3) Transcriptional ability:

The transcriptional ability is represented by [height of the convex of DVD substrate/depth of the concave of the mold (5 μm)]×100. The data of 20 samples were averaged. For the measurement, used was a measure scope UM-3 made by Nikon Co., Ltd.

(4) Birefringence (Δn):

Using a double refraction measurement system ADR-2000 made by Oak Co., Lt(d., the birefringence (Δn) of each disk sample was measured at randomly selected points on the circle of 30 mm and 50 mm from its center. The relationship between the birefringence (Δn) and the retardation (R) is represented by R=Δn·t, wherein t indicates the thickness of the disk sample (nm). Table 1 shows the absolute value (nm) of the retardation (R=Δn·t).

(5) Steaming Resistance:

To evaluate its steaming resistance, each disk sample was exposed to steam at 121° C. for 48 hours, and its outward appearance was macroscopically checked.

(6) Viscosity-average Molecular Weight (Mv):

Using an Ubbelohde's viscometer, the intrinsic viscosity [η] of each polycarbonate sample in a methylene chloride solution at 20° C. was measured. Mv is calculated according to the following equation.

$$[\eta] = 1.23 \times 10^{-5} \cdot Mv^{0.83}$$

(7) Weight-average molecular weight/Number-average molecular weight (ratio of Mw/Mn)

The weight-average molecular weight (Mw) and the number-average molecular weight (Mn) of each polycarbonate sample was measured through gel permeation chromatography (GPC), and the ratio Mw/Mn was obtained.

EXAMPLE 1

(1) Production of Polycarbonate Resin A:

2283 g (10.0 mols) of bisphenol A, 2249 g (10.5 mols) of diphenyl carbonate, and a catalyst of an aqueous 10 wt. % solution of tetramethylammonium hydroxide (2.4× $10^{-4}$ mols relative to bisphenol A) and tetraphenylphosphonium tetraphenylborate (1.0×$10^{-6}$ mols relative to bisphenol A) were put into a 10-liter nickel autoclave, which was purged five times with argon gas. Next, the mixture was heated at 180° C., and reacted in argon for 30 minutes. Then, this was gradually heated up to 235° C. while being degassed to a vacuum degree of 60 mmHg, and further reacted for 60 minutes. Further, this was gradually heated up to 270° C. while being degassed to a vacuum degree of 10 mmHg, and still further reacted for 120 minutes. Next, this was kept at 270° C. while being further degassed to a vacuum degree of 1 mmHg, and reacted for 30 minutes, and thereafter for 15 minutes after having been still further degassed to a vacuum degree of 0.5 mmHg. After the reaction, the reactor was purged with argon gas to be at atmospheric pressure, and the reaction mixture was taken out of the reactor, and, while it was in melt, fed into a double-screw extruder by the action of a gear pump, and pelletized therethrough to obtain pellets of polycarbonate resin A.

The viscosity-average molecular weight (Mv) of the polycarbonate resin A, and the ratio of weight-average molecular weight/number-average molecular weight, Mw/Mn thereof are shown in Table 1.

EXAMPLE 2

(1) Production of Polycarbonate Resin B:

Pellets of polycarbonate resin B were obtained in the same manner as in Example 1-(1), except that sodium hydroxide was used in place of tetraphenylphosphonium tetraphenyl borate, and that, prior to feeding the polymer melt to the double-screw extruder for pelletization, 1.8 ppm, relative to the weight of the polymer, of butyl p-toluenesulfonate and 100 ppm, relative to the same, of 3,4-epoxycyclohexylmethyl-3',4'-epoxycyclohexyl carboxylate were added to the polymer. Mv and Mw/Mn of the polycarbonate resin B are shown in Table 1.

EXAMPLE 3

(1) Production of Polycarbonate Resin C:

Pellets of polycarbonate resin C were obtained in the same manner as in Example 1-(1), except that the amount of diphenyl carbonate was changed to 2185 g (10.2 mols). Mv and Mw/Mn of the polycarbonate resin C are shown in Table 1.

COMPARATIVE EXAMPLE 1

(1) Preparation of Polycarbonate Oligomer:

60 kg of bisphenol A was dissolved in 400 liters of aqueous 5 wt. % sodium hydroxide solution to prepare an aqueous sodium hydroxide solution of bisphenol A.

Next, this solution kept at room temperature was fed into a tubular reactor having an inner diameter of 10 mm and a length of 10 m at a flow rate of 138 liters/hr, along with methylene chloride at a flow rate of 69 liters/hr, through an orifice plate, while phosgene was simultaneously introduced thereinto at a flow rate of 10.0 kg/hr, and these were continuously reacted for 3 hours. The tubular reactor used herein was a double tube, and cooling water was circulated through its jacket by which the reaction mixture being discharged out of the reactor was kept at 25° C.

The reaction mixture being discharged was controlled to have a pH of from 10 to 11. The thus-obtained reaction mixture was allowed to stand, thereby separating and removing the aqueous layer, and a methylene chloride phase (220 liters) was collected to obtain a polycarbonate oligomer.

(2) Production of Polycarbonate Resin D:

118.0 g of p-tert-butylphenol was dissolved in 10.0 liters of the polycarbonate oligomer obtained in (1), to which were added aqueous sodium hydroxide solution (NaOH: 75 g, water: 1.0 liter) and 1.17 ml of triethylamine, and stirred at 300 rpm at room temperature for 30 minutes. Next, methylene chloride (8 liters) and an aqueous sodium hydroxide solution of bisphenol A (bisphenol A: 607 g, NaOH: 320 g, water: 5 liters) were added thereto, and stirred at 500 rpm at room temperature for 1 hour.

Next, 5 liters of methylene chloride and 5 liters of water were added thereto, and stirred at 500 rpm at room temperature for 10 minutes. After the stirring was stopped, the mixture was allowed to stand for phase separation, from which was obtained an organic layer. This organic layer was subjected to alkali washing with 5 liters of 0.03 N sodium hydroxide, acid washing with 5 liters of 0.2 N hydrochloric acid, and water washing (twice) with 5 liters of water in that order. Then, methylene chloride was evaporated out to obtain a flaky polycarbonate.

The resulting polycarbonate flakes were dried in vacuum at 120° C. for 48 hours, and then extruded at 230° C. to obtain pellets of polycarbonate resin C. Mv and Mw/Mn of the polycarbonate resin C are shown in Table 1.

COMPARATIVE EXAMPLE 2
(1) Production of Polycarbonate Resin E:

Pellets of polycarbonate resin E were obtained in the same manner as in Example 1-(1), except that tetramethylammonium hydroxide ($2.5 \times 10^{-4}$ mols relative to bisphenol A) only was used as the catalyst. Mv of the polycarbonate resin E is shown in Table 1.

COMPARATIVE EXAMPLE 3
(1) Production of Polycarbonate Resin F:

Pellets of polycarbonate resin F were obtained in the same manner as in Example 1-(1), except that sodium hydroxide ($2.5 \times 10^{-4}$ mols relative to bisphenol A) only was used as the catalyst. Mv and Mw/Mn of the polycarbonate resin F are shown in Table 1.

EXAMPLE 4
(1) Production of Polycarbonate Resin G:

Flaky polycarbonate resin G was obtained in the same manner as in Comparative Example 1-(2) for production of polycarbonate resin D, except that the amount of p-tert-butylphenol was changed to 92.2 g. Mv and Mw/Mn of the polycarbonate resin G were 17,400 and 2.1, respectively.

(2) Production of Polycarbonate Resin H:

Flaky polycarbonate resin H was obtained in the same manner as in Comparative Example 1-(2) for production of polycarbonate resin D, except that the amount of p-tert-butylphenol was changed to 160.0 g. Mv and Mw/Mn of the polycarbonate resin H were 11,400 and 2.1, respectively.

(3) Production of Polycarbonate Resin I:

The polycarbonate resin G obtained in (1) and the polycarbonate resin H obtained in (2) were, after having been dried in vacuum at 120° C. for 48 hours, dry-blended in a ratio of 1/1 by weight, and then extruded at 230° C. to obtain pellets of polycarbonate resin I. Mv and Mw/Mn of the polycarbonate resin I are shown in Table 1.

transcriptional ability. Therefore, the digital video disk substrate is favorably used as those for digital video disks (DVD family) for read-only-memory type, writing-once type, rewritable type and the like media.

What is claimed is:

1. A digital video disk substrate of a polycarbonate having a viscosity-average molecular weight Mv of from 10,000 to 17,000 and a weight-average molecular weight Mw/number-average molecular weight Mn of not smaller than 2.3.

2. A digital video disk substrate of a polycarbonate obtained by the transesterification of a diphenol and a carbonic acid diester to have a viscosity-average molecular weight (Mv) of from 10,000 to 17,000.

3. The digital video disk substrate as claimed in claim 2, wherein a nitrogen-containing basic compound and a nitrogen-free basic compound are used as the catalyst for the transesterification.

4. The digital video disk substrate as claimed in claim 3, wherein the nitrogen-containing basic compound is a quaternary ammonium salt.

5. The digital video disk substrate as claimed in claim 3, wherein the nitrogen-free basic compound is a quaternary phosphonium salt.

6. The digital video disk substrate as claimed in claim 4, wherein the quaternary ammonium salt is tetramethylammonium hydroxide.

7. The digital video disk substrate as claimed in claim 5, wherein the quaternary phosphonium salt is traphenylphosphonium tetraphenylborate.

8. The digital video disk substrate as claimed in claim 1, wherein the polycarbonate has a viscosity-average molecular weight Mv of from 12,000 to 16,000.

9. The digital video disk substrate as claimed in claim 1, wherein the polycarbonate has a viscosity-average molecular weight Mv of from 13,500 to 15,500.

TABLE 1

|  | Example 1 | Example 2 | Example 3 | Example 4 | Comparative Example 1 | Comparative Example 2 | Comparative Example 3 |
|---|---|---|---|---|---|---|---|
| Polycarbonate | A | B | C | I | D | E | F |
| Mv | 14200 | 14400 | 14800 | 14100 | 14400 | 8000 | 18000 |
| Mw/Mn | 2.7 | 2.7 | 2.4 | 2.4 | 2.0 | — | 2.6 |
| Number of Non-cracked Samples | 100 | 100 | 95 | 90 | 10 | 0 | 100 |
| Falling Weight Impact Strength (J) | 0.55 | 0.55 | 0.47 | 0.40 | 0.11 | — | 0.60 |
| Transcriptional ability (%) | 93 | — | 93 | 93 | 92 | — | 92 |
| Retardation (nm) | | | | | | | |
| 30 mm | 57 | — | 58 | 57 | 57 | — | 195 |
| 50 mm | 58 | — | 59 | 58 | 58 | — | 200 |
| Steaming Resistance | transparent | transparent | transparent | transparent | transparent | — | opaque |

INDUSTRIAL APPLICABILITY

The digital video disk substrate of the invention comprises a polycarbonate of which the molecular weight falls within a specific range and which has a broad molecular weight distribution, or a polycarbonate which is obtained by transesterification to have a molecular weight falling within a specific range. The substrate is cracked little at the time of molding and exhibits small birefringence and excellent 10. The digital video disk substrate as claimed in claim 2, wherein the polycarbonate has a viscosity-average molecular weight Mv of from 12,000 to 16,000.

11. The digital video disk substrate as claimed in claim 2, wherein the polycarbonate has a viscosity-average molecular weight Mv of from 13,500 to 15,500.

* * * * *